United States Patent [19]
Kraft

[11] Patent Number: 5,350,033
[45] Date of Patent: Sep. 27, 1994

[54] ROBOTIC INSPECTION VEHICLE

[76] Inventor: Brett W. Kraft, 11667 W. 90th St., Overland Park, Kans. 66214

[21] Appl. No.: 53,083

[22] Filed: Apr. 26, 1993

[51] Int. Cl.⁵ .......................... B62D 1/28; H04N 7/18
[52] U.S. Cl. ..................................... 180/167; 180/6.5; 180/6.58; 180/8.2; 180/9.32; 348/82; 348/118; 364/424.02; 901/1
[58] Field of Search ....................... 180/6.5, 6.58, 167, 180/7.1, 8.2, 9.32, 9.34, 9.36, 9.38; 901/1; 364/424.02; 340/728; 358/103

[56] References Cited

U.S. PATENT DOCUMENTS

| | | |
|---|---|---|
| 4,648,782 | 3/1987 | Kraft . |
| 4,855,822 | 8/1989 | Narendra et al. ................ 901/1 |
| 5,101,351 | 3/1992 | Hattori ........................... 180/167 |

FOREIGN PATENT DOCUMENTS

| | | | |
|---|---|---|---|
| 263213 | 10/1990 | Japan ................... | 180/167 |
| 2121741 | 1/1984 | United Kingdom ........ | 180/167 |

*Primary Examiner*—Mitchel J. Hill
*Attorney, Agent, or Firm*—Litman, McMahon & Brown

[57] ABSTRACT

A remotely controllable robotic inspection vehicle includes a fixed housing which can accommodate a number of modular inspection and/or robotic arm components. The base unit includes two drive and two free castering wheels arranged in an independently articulating configuration which insures that at least three of the wheels are in a supporting position at all times and that the drive wheels always have traction. Thus, when small objects, such as construction debris, uneven floors, etc., are encountered, the vehicle easily traverses them with no danger of tipping or loss of traction. The two drive wheels are independently powered, which permits the vehicle to be rotated in a very small confined space about the same diameter as the width of the vehicle. A centrally mounted, modular telescoping camera assembly includes a camera which can be raised and lowered as well as rotated in the vertical and horizontal planes and/or a modular robotic arm. The vehicle can be lowered into remote areas, such as underground transformer housings, etc. to perform inspections and repairs.

28 Claims, 6 Drawing Sheets

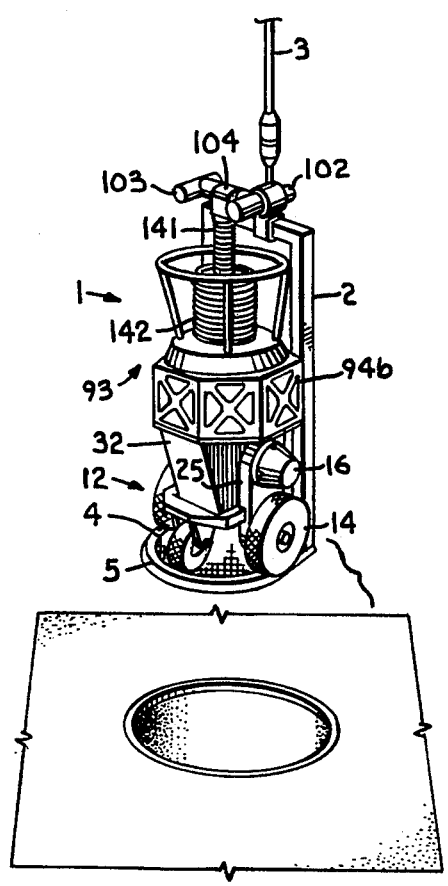
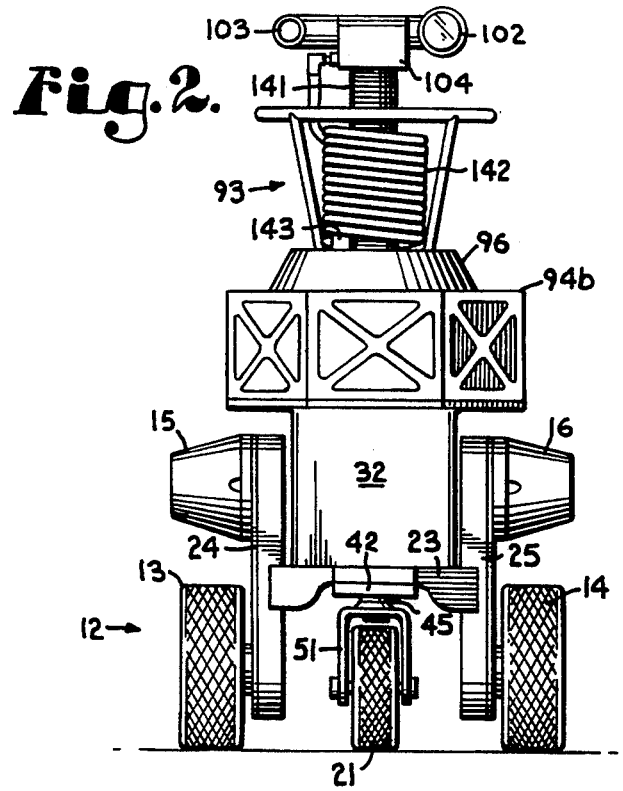
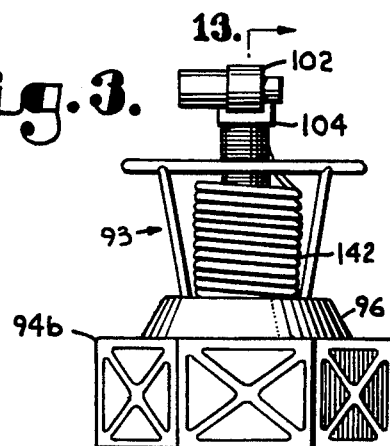
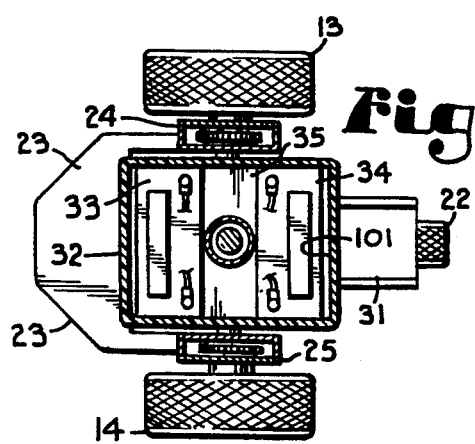
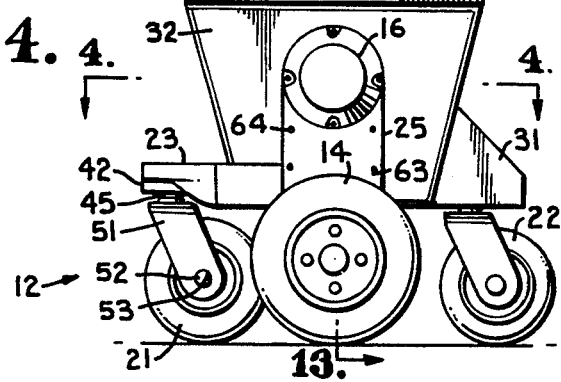

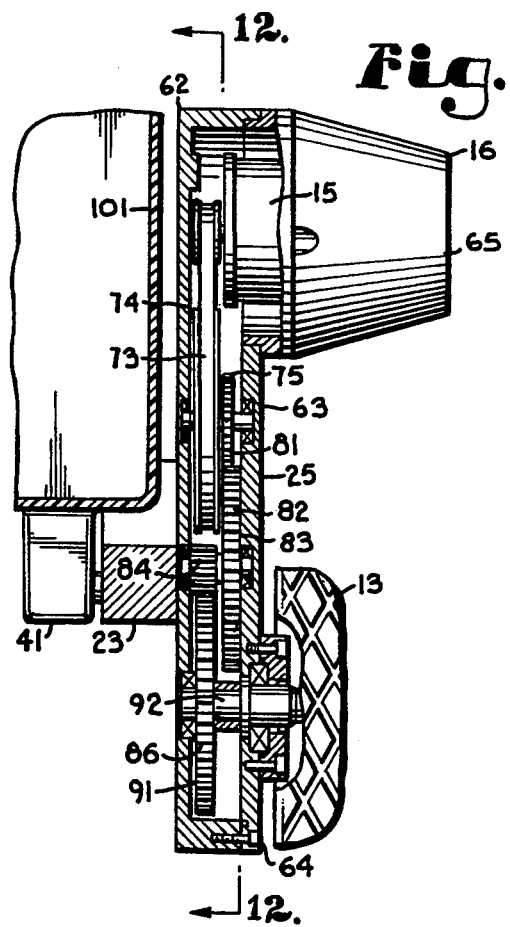
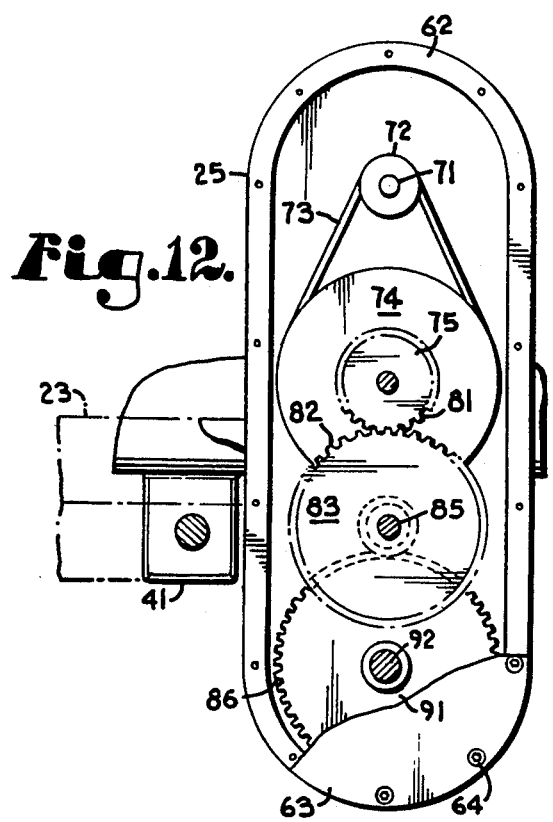
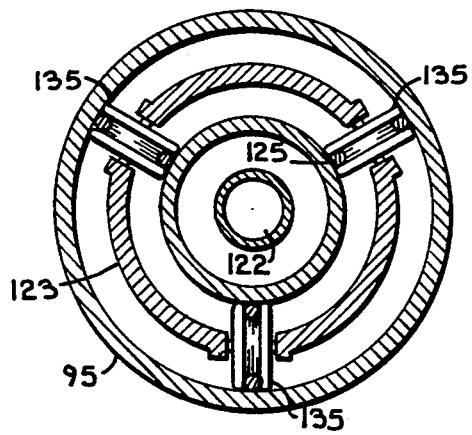
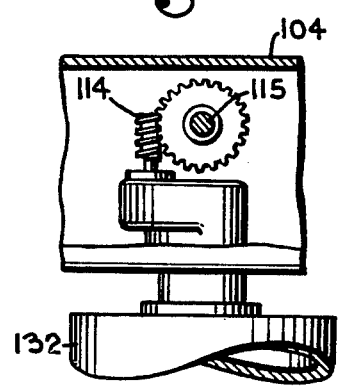

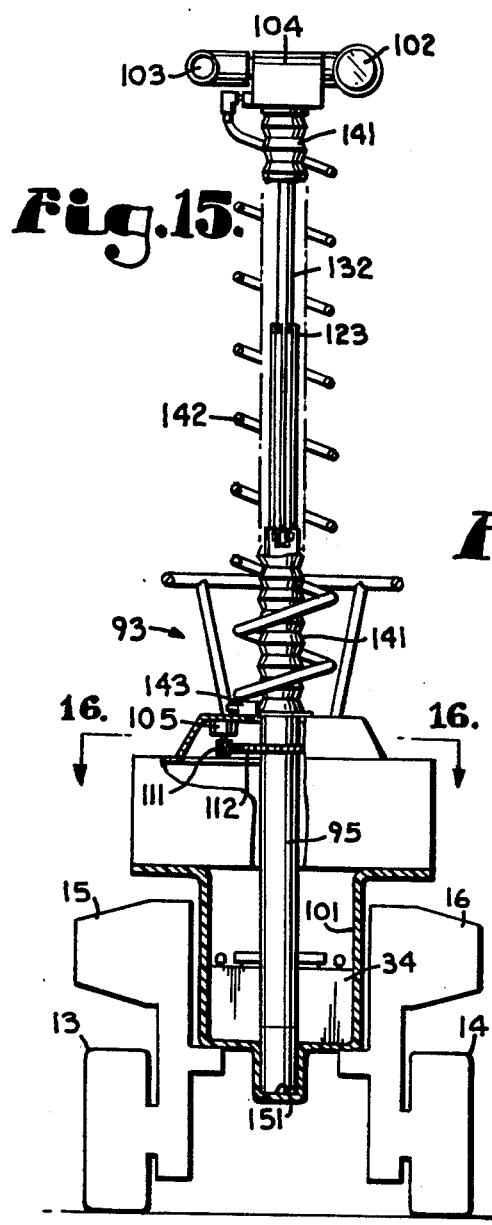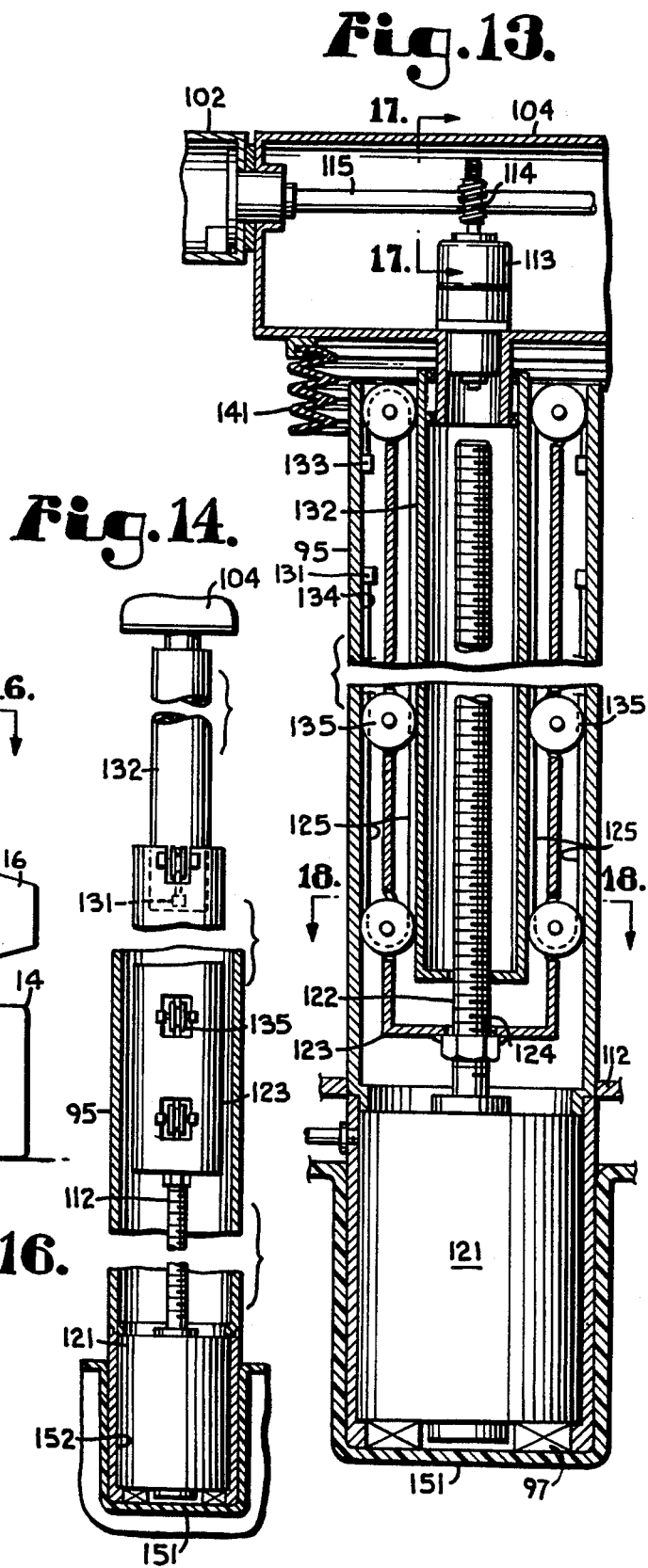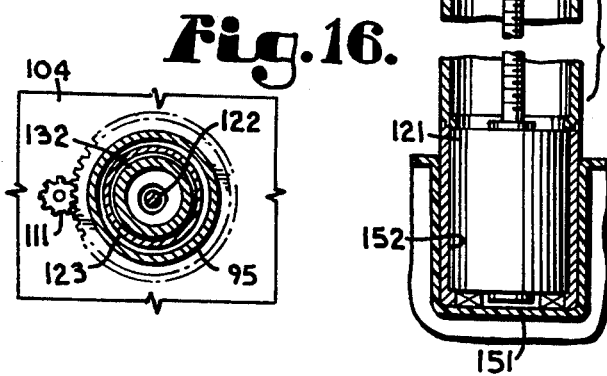

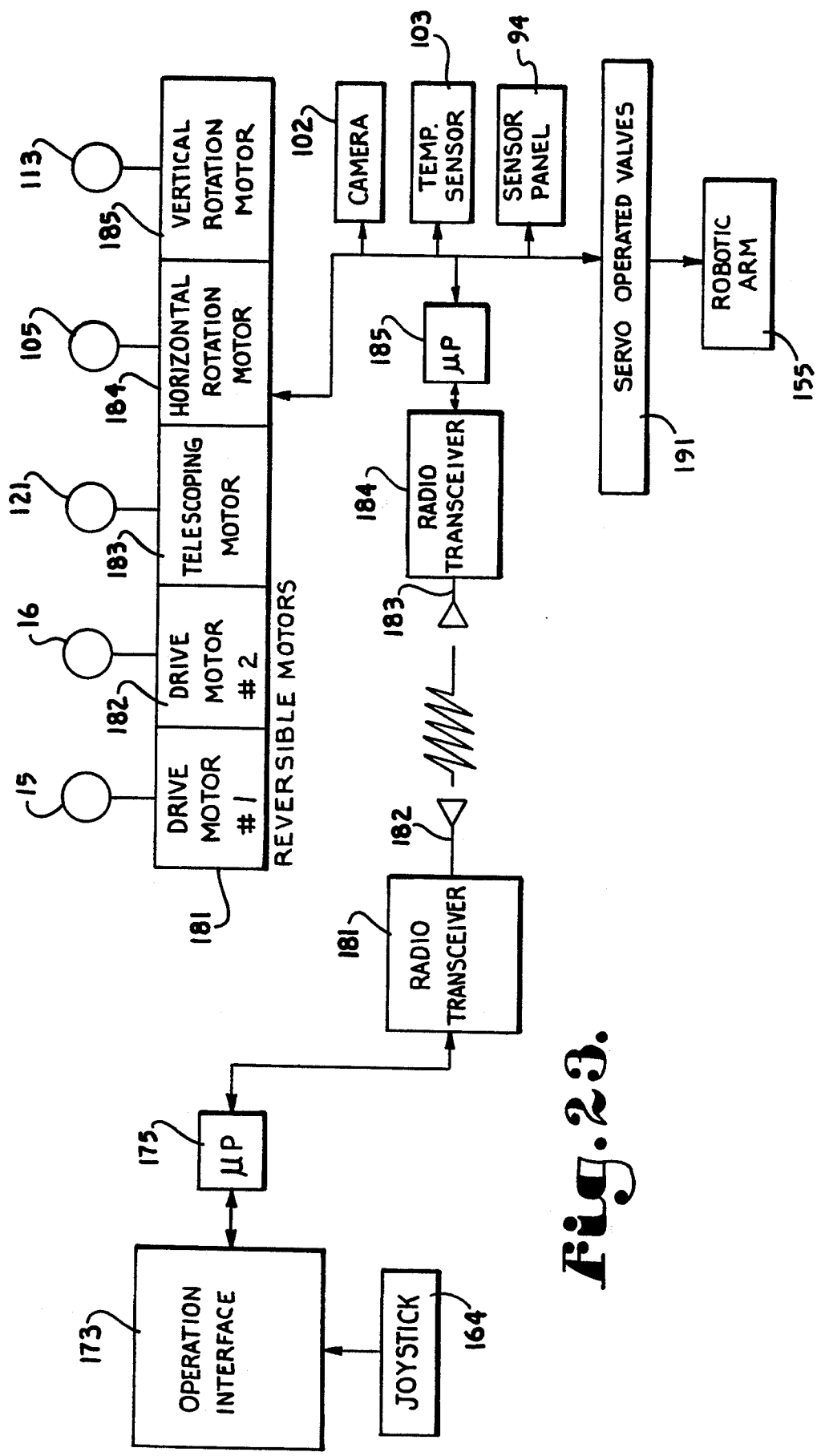

ROBOTIC INSPECTION VEHICLE

BACKGROUND OF THE INVENTION

The present invention relates to a remotely controlled robotic vehicle, and more specifically, to a robot designed for remote inspection of underground utilities and other dangerous or highly confined locations.

There are numerous examples of remote dangerous and/or highly confined areas which need regular inspection and maintenance, but which are not safe for human occupation. Probably the most common example of such facilities is underground electrical utility vaults containing equipment such as high voltage electrical transformers and associated circuit breaker systems and the like. Such vaults can be extremely hazardous areas, particularly in the case of overloaded or faulty transformers, which can burn, giving off extreme heat and noxious fumes, or even explode. Often vaults of this type can be accessed only through manholes, which are often only 28 to 36 inches in diameter. Other examples of dangerous and/or highly confined facilities include large gas utility vaults and radioactive environments, such as nuclear reactor containment buildings, cooling pipes, etc.

It is desirable for such dangerous areas to at least initially be inspected by remotely operated cameras, to determine possible hazards. One solution is to install remotely controlled video cameras at all critical inspection areas within the facility. In a fairly new facility, this may prove to be a reasonable solution, but it can involve considerable initial cost and entail a substantial ongoing maintenance and replacement expense. This is not a viable alternative for aging power networks existing, for example, in major east coast cities in the United States. These networks can include thousands of underground vaults.

Furthermore, for such remote areas which have been in continuous use for long periods of time, retrofitting the areas with cameras can be as dangerous or more so than physically inspecting the facilities. These areas are often partially flooded and/or muddy and dirty, such that cameras would sometimes be adversely affected by the environment due to long term exposure. Finally, it is not always possible to predict the particular areas of a facility which will need inspection, and providing video coverage of every square foot of a facility is practically, as well as economically, infeasible.

Another solution is to use remotely controlled, mobile camera carrying vehicles which can inspect and, in some instances, even perform some minimal repairs. While various types of robotic devices that are remotely controlled vehicles are available, one major drawback is the limited ability of such vehicles to operate in the required confined spaces while being able to traverse obstacles. Many prior art vehicles have the ability to traverse obstacles by use of track type driving mechanisms, but they are normally relatively large and do not fit through manholes nor are they able to maneuver in the tight confines in vaults of this type. Other types of robots have existed that are three or four wheeled and which can turn easily and maneuver in fairly confined spaces, but these robots cannot traverse obstacles. Often they cannot traverse obstacles as simple as a ramp, uneven pavement or obstacles such as paper, boards, etc. In accordance with the present invention it is desirable that vehicles must also fit through small openings such as manholes. In addition since the inspection vehicles of the present invention must often run on batteries, it is desirable that such vehicles have low energy demands. Because tracked vehicles and four wheel skid steer vehicles lose a large amount of energy to friction during turns, it is desirable to avoid vehicles of this type.

Many underground electrical installations, particularly in older cities, have been in continuous use for several decades. In some instances, transformer vaults and related equipment have not been inspected for years and sometimes not since their initial installation. In such facilities, construction debris, ceiling and wall material, and other obstacles litter the facility floors. As noted above existing remotely controlled vehicles are simply incapable of both traversing the obstacles and operating in such confined spaces. Of course, should a remote vehicle tip over in an inaccessible or hazardous location, it would be difficult to retrieve it or could create an added hazard to a human.

Accordingly, a more reliable and stable vehicle is needed for performing inspections in remote facilities which have confined spaces and/or hazardous conditions. Such a vehicle should be capable of being reliably, remotely controlled to operate in tight or confined spaces, should be extremely durable and reliable and should be capable of traversing obstacles without danger of tipping. At the same time, such a vehicle should be relatively inexpensive, have relatively low energy consumption and should preferably be of an adaptable, modular design and thus be capable of performing a wide variety of inspection and repair tasks. The vehicle should also have the ability to access an area to be inspected through a manhole.

SUMMARY OF THE INVENTION

The present invention is directed to a remotely controllable robotic inspection vehicle which is capable of carrying a variety of modular components, including video cameras, temperature sensors and other test equipment. The vehicle includes an articulating support and drive assembly which enables it to traverse obstacles with enhanced stability and relative ease. In particular the vehicle favorably utilizes a combination of wheel alignment and articulation to both allow the vehicle to be able to generally rotate about a central vertical axis thereof while having a relatively small profile so as to be very maneuverable in confined spaces and being able to traverse obstacles in the spaces, especially due to the articulation. More specifically, the support and drive assembly includes four wheels, of which a front and a rear wheel are free castering, and a pair of centered main wheels, each of which is driven by an independent motor and drive mechanism. Thus, with one main wheel driven in each direction, the vehicle can be turned or roboted about a central axis thereof within its own width.

The front, free castering wheel and the main wheels, as well as the drive motors and drive mechanisms, are all connected to a platform. The rear castering wheel is connected directly to the vehicle housing. The platform and the vehicle housing are pivotably attached to each other such that, when the front wheel encounters an obstacle, the platform pivots upward, pivoting the drive motors and drive mechanisms backward with respect to the housing. Conversely, when the rear wheel encounters an obstacle, the lower housing pivots forward with respect to the platform. The net effect of this articulation is that the center of gravity of the vehicle is always centered between the main wheels and the free castering wheel which is in ground contact. This makes the vehicle extremely stable as it traverses an obstacle. This also ensures that the drive wheels are positioned on the ground with weight distributed thereon to ensure that the drive wheels have traction on the floor being traversed which in turn ensures that the remote operator maintains control over the vehicle and can make the vehicle move in a desired direction.

A modular telescoping camera assembly is inserted within a cavity in the lower housing, and includes a mechanism for raising and lowering an inspection camera and other sensors mounted on top of the telescoping camera assembly. A modular sensor panel is removably attached to the housing and surrounds the telescoping assembly. The sensor panel includes a number of sensor units, and, with its modular construction, it can be replaced by other sensor panels to change the capabilities of the vehicle. An optional robotic arm can be attached to the vehicle housing to replace the telescoping camera assembly to give the vehicle the capacity to perform routine maintenance and to make basic repairs.

OBJECTS AND ADVANTAGES OF THE INVENTION

The principal objects of the present invention include: to provide an improved robotic inspection vehicle; to provide such a vehicle which is capable of inspecting facilities in confined spaces that are or may be hazardous for human inspectors; to provide such a vehicle which has an articulating support and drive assembly to provide stability in traversing obstacles, such as pipes and uneven flooring and which ensures traction for the drive wheels of the vehicle, even when traversing an obstacle; to provide such a vehicle which includes a modular telescoping camera assembly for performing remote inspections; to provide such a vehicle which includes a modular sensor panel which incorporates a plurality of sensor units; to provide such a vehicle which can include a modular, remotely controllable robotic ,arm which can replace the telescoping camera assembly for performing routine maintenance and basic repair work; to provide such a vehicle which can be readily adapted for different inspection or repair tasks by changing sensor panels and substituting the camera assembly for the robotic arm and vice versa; to provide such a vehicle which conserves energy, as compared to tracked vehicles or skid steer vehicles, by reducing friction; to provide such a vehicle which is relatively inexpensive and which is easily repairable; and to provide such a vehicle which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a remotely controlled robotic vehicle positioned on a transport frame and being lowered into a utility manhole.

FIG. 2 is an enlarged front elevational view of the robotic vehicle.

FIG. 3 is an enlarged side elevational view of the robotic vehicle.

FIG. 4 is an enlarged, cross-sectional view of the robotic vehicle, taken along line 4—4 of FIG. 3, and illustrating a battery storage region for providing electrical power to the vehicle.

FIG. 11 is a greatly enlarged and fragmentary front plan view, with portions of the vehicle housing broken away to illustrate the drive mechanism for one of the main wheels.

FIG. 12 is an enlarged and fragmentary, cross-sectional view, taken along line 12—12 of FIG. 11, and also illustrating the drive mechanism for one of the main wheels.

FIG. 13 is a greatly enlarged and fragmentary, cross-sectional view, taken along line 13—13 of FIG. 3, and illustrating a telescoping camera assembly.

FIG. 14 is an enlarged and fragmentary front plan view, illustrating the telescoping camera assembly of FIG. 13 as it is being raised.

FIG. 15 is an enlarged and partially schematic front plan view, illustrating the telescoping camera assembly of FIG. 13 in a fully elevated position, with portions of the housing broken away to illustrate the interior thereof.

FIG. 16 is an enlarged, fragmentary cross-sectional view, taken along line 16—16 of FIG. 13, and illustrating a motorized horizontal rotating mechanism.

FIG. 17 is an enlarged, fragmentary cross-sectional view, taken along line 17—17 of FIG. 13, and illustrating a motorized vertical rotating mechanism.

FIG. 18 is an enlarged, fragmentary cross-sectional view, taken along line 18—18 of FIG. 13, and illustrating the interior of the telescoping camera assembly of FIG. 13.

FIG. 23 is a block electrical diagram illustrating a remote radio control system for the robotic inspection vehicle.

DETAILED DESCRIPTION OF THE INVENTION

Figure 5:
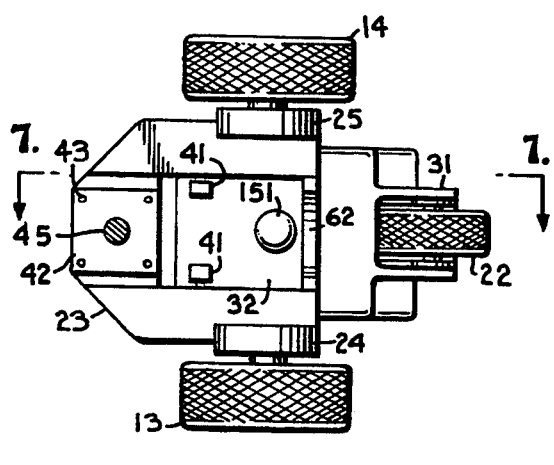
FIG. 5 is an enlarged bottom plan view of the robotic vehicle with the front castering wheel removed, and illustrating the pivotable platform.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the reference numeral 1 generally indicates a remotely controllable robotic vehicle adapted to provide an inspection and repair capability in inaccessible and/or dangerous remote areas. In FIG. 1, the vehicle 1 is shown positioned on a transport frame 2 to which a cable 3 is attached for raising and lowering the frame 2. The frame 2 includes a platform 4, with a tapered transition area 5 which allows the vehicle 1 to be easily rolled onto and off of the platform 4. The vehicle 1 and frame 2 are shown being lowered through a manhole 11 into an underground utility facility, such as, for example, a transformer or circuit breaker vault (not shown).

Figure 6:
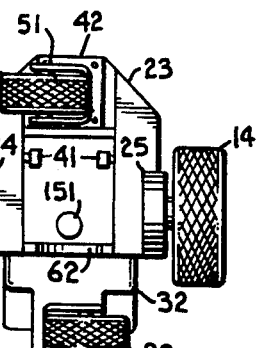
FIG. 6 is an enlarged bottom plan view of the robotic vehicle, illustrating the castering wheels turned 90 degrees such that the vehicle can be rotated and reversed within its own length.

The vehicle 1 is equipped with an articulating drive and support assembly 12, which is best illustrated in FIGS. 2–10. The drive and support assembly 12 includes a pair of main drive wheels 13 and 14, each of which is independently driven by a respective motor 15 and 16. A free castering wheel 21 is positioned in front of the main wheels 13 and 14 while a similar free castering wheel 22 is positioned behind the main wheels 13 and 14. The front castering wheel 21 is attached to a pivoting U shaped platform 23, to which platform 23 the motors 15 and 16 and the main wheels 13 and 14 are also attached, via a respective pair of drive mechanisms 24 and 25. The rear castering wheel 22 is attached to an extension 31, which is rigidly attached to a vehicle housing 32. The spacing between the wheels 13 and 14 is approximately the same as the opening between the wheels 21 and 22 when the later are turned to allow rotation of the vehicle 1 (as is shown in FIG. 6) so as to allow the vehicle 1 to generally rotate about a central axis.

Referring to FIG. 4, a pair of batteries 33 and 34, which supply electrical power to the entire vehicle 1, are positioned on a floor 35 of the housing 32 such that the relatively heavy weight of the batteries help to provide a lowered center of gravity for the vehicle 1.

The operation of the articulating support and drive assembly 12 will now be described, with particular reference to FIGS. 5–10. FIG. 5 illustrates the U shaped platform 23 pivotally attached to the housing 32 via a pair of gimbal mounts 41. The front castering wheel 21 is shown removed for ease of illustration. A plate 42 is bolted to the platform 23 via a plurality of bolts 43. A center bore 44 in the plate 42 is adapted to accommodate, in a free castering manner, a vertically oriented rod 45 which, in turn, is attached to a conventional split axle support 51.

An axle 52 extends through a pair of bores 53 in the support 51, and through a bore (not shown) in the wheel 21. The wheel 22 is supported in the same fashion by a similar bore 54, shown in phantom lines in FIG. 7 through a similar support plate (not shown), and will thus not be further described. FIG. 6 illustrates the assembly 12 in a turning orientation with the castering wheels 21 and 22 turned in opposite ninety degree directions. With the main wheels 13 and 14 independently driven and independently reversible, the vehicle 1 can be turned in its own width simply by driving the main wheels 13 and 14 in opposite directions while the castering wheels 21 and 22 assume the position shown.

The main wheels 13 and 14 generally rotate about a common axis of rotation that passes substantially near to the physical center of the vehicle 1 taken relative to a horizontal plane passing through the imaginary axis of rotation. In addition no part of the vehicle 1, except for the rotatable castering wheels 21 and 22, is wider than the distance between the outside of the wheels 13 and 14 which are spaced and configured to pass through the manhole 11 having a 28 inch diameter. In this manner the entire vehicle 1 is able to pass through the manhole 11, while the wheels 13 and 14 are correspondingly spaced as wide as possible to pass through the manhole 11, yet maintain a relatively wide spacing to help ensure stability of the vehicle 1.

Figure 7:
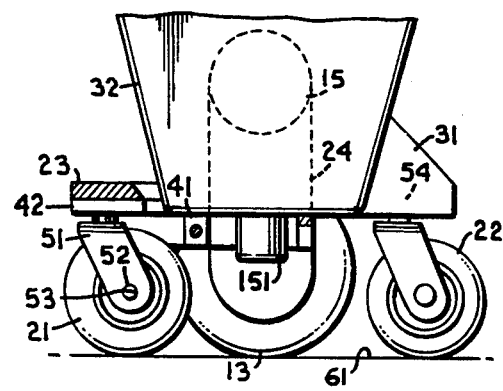
FIG. 7 is an enlarged, cross-sectional view of the robotic vehicle, taken along line 7—7 of FIG. 5, and illustrating the vehicle traversing a flat surface and with the motor 15 and the drive mechanism 24 illustrated in phantom lines.
Figure 8:
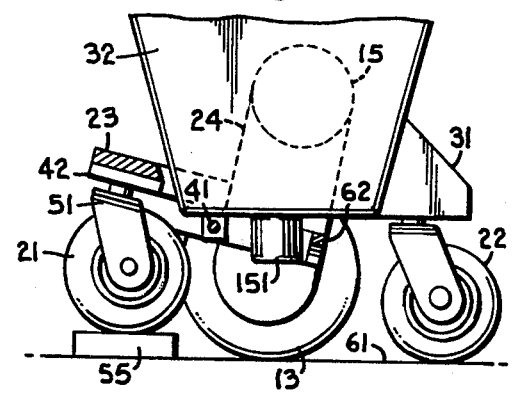
FIG. 8 is an enlarged, cross-sectional view of the robotic vehicle, taken along line 7—7 of FIG. 5, and illustrating the vehicle encountering an obstacle whereby the front wheel rides up onto the obstacle.

Referring to FIGS. 7–10, the vehicle is illustrated in progressive stages as a small obstacle 55 is encountered and traversed. In FIG. 7, the vehicle 1 is on a level floor surface 61, with all four wheels in contact with the surface 61. The U shaped platform 23 assumes a horizontal position where a stop 62, which extends across the bottom of the housing 32, abuts the bottom of the housing 32. In FIG. 8, the front castering wheel 21 encounters the obstacle 55 and rides up on top of it. This causes the platform 23 to pivot clockwise about the gimbal mounts 41 and relative to the housing 32, and shifts the motors 15 and 16 and the drive mechanisms 24 and 25 to the right. This has the effect of shifting the center of gravity of the vehicle 1 to a point between the main wheels 13 and 14 and the rear wheel 22, as shown in phantom lines. This greatly enhances the stability of the vehicle 1 as it traverses the obstacle 55 and ensures that the main wheels 13 and 14 substantially always engage the floor surface 61 with some pressure applied thereto due to the weight of the vehicle 1 such that the wheels 13 and 14 have traction and so that the locomotion of the vehicle 1 can be controlled thereby.

Figure 9:
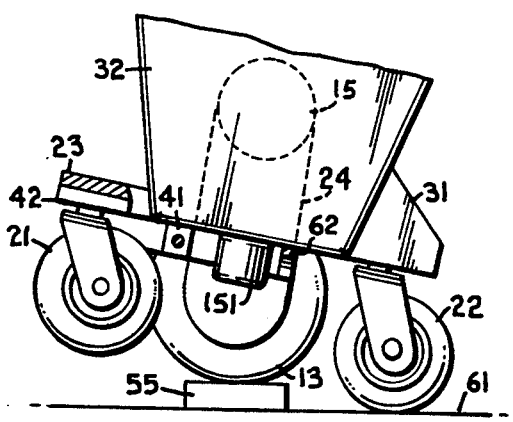
FIG. 9 is an enlarged, cross-sectional view of the robotic vehicle, taken along line 7—7 of FIG. 5, and illustrating the vehicle main wheels riding onto the obstacle.

In FIG. 9, the front castering wheel 21 has cleared the obstacle 55, which permits the platform 23 to pivot back to its original horizontal orientation while the main wheels 13 and 14 roll onto the obstacle 55. Note that this keeps the center of gravity centered between the main wheels 13 and 14 and the rear castering wheel 22 and maintains part of the 13 overall weight of the vehicle 1 on each of the main wheels 13 and 14.

Figure 10:
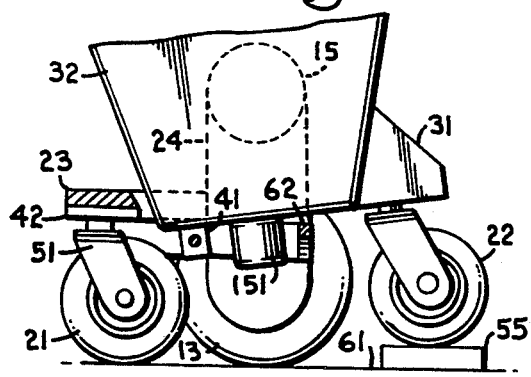
FIG. 10 is an enlarged, cross-sectional view of the robotic vehicle, taken along line 7—7 of FIG. 5, and illustrating the vehicle rear wheel riding onto the obstacle.

In FIG. 10, the main wheels 13 and 14 have cleared the obstacle 55 while the rear castering wheel 22 has rolled on top of it. This causes the platform 23 to again pivot about the gimbal mounts 41, which causes the housing 32 to shift toward the front castering wheel 21. In this position the center of gravity of the vehicle 1 is again shifted such that it is centered between the main wheels 13 and 14 and the front castering wheel 21, i.e. the three wheels in contact with the floor 61 under weight of the vehicle 1 such that the main wheels 13 and 14 have traction. It is readily apparent then, that the drive and support assembly 12 is designed to maximize stability and traction for the vehicle 1 in any of these positions. This capability is very important for operation in remote areas where it would be disastrous for the vehicle 1 to tip over.

Referring to FIGS. 11 and 12, the drive mechanism 24 between the drive motor 15 and the main wheel 13 is illustrated. It should be recognized that the drive mechanism 25 for the opposite main wheel 14 is simply a mirror image of the mechanism 24. The drive mechanism 24 includes a housing 62 with a cover plate 63 bolted thereto via a plurality of bolts 64. The motor 15 is contained within a motor housing 65, and includes a drive shaft 71 which is connected to a drive pulley 72. A drive belt 73 extends between the drive pulley 72 and a pulley 74. A gear wheel 75 is concentrically attached to the center of the pulley 74, with gear teeth 81 meshing with corresponding gear teeth 82 in a gear reduction wheel 83. Gear teeth 84 in a concentrically mounted gear wheel 85 mesh with teeth 86 in a large gear wheel 91. The gear wheel 91 is directly and concentrically connected to an axle 92 upon which is mounted the wheel 13 such that the motor 15 operably rotates the wheel 13. The motor 15 is reversible, allowing the wheel 13 to be driven in either direction. Note that the drive mechanism 24 is spaced form the housing 32, allowing it to pivot relative thereto with the platform 23, as described above.

Referring to FIGS. 13–18 and 20, a modular telescoping camera assembly 93 or mast is shown bolted to a sensor panel 94, which, in turn, is attached to the housing 32. The telescoping assembly 93 includes an elongate tube 95 which extends through an interior cavity 101 in the housing 32 with the greatest weight of the tube 95 being located near the lower end to help maintain the center of gravity of the vehicle 1 relatively low. A video camera 102 and an infrared temperature sensor 103, which can be laser guided, are mounted on a horizontally rotatable support 104.

Figure 19:
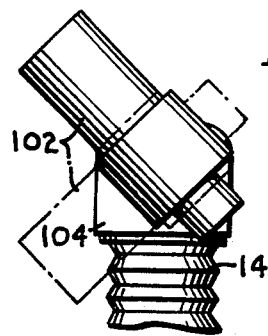
FIG. 19 is a greatly enlarged and fragmentary side plan view of the video camera and support, showing the camera rotating through the vertical plane.
Figure 20:
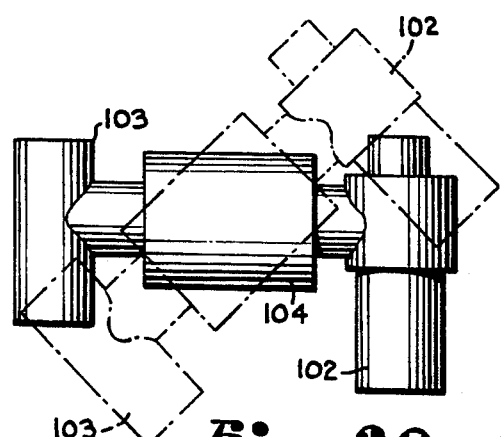
FIG. 20 is a greatly enlarged and fragmentary top plan view of the video camera and support, showing the camera rotating through the horizontal plane.

To manipulate the camera 102 and the sensor 103, a motor 105 mounted in the cover housing 96 drives a gear 111 which, in turn, drives a reduction gear 112 which is attached to and rotates the tube 95 about the vertical axis (FIGS. 16 and 20). The lower end of the tube 95 is in the housing 32 on bearings 97 to allow rotation tube 95 relative to the rest of the vehicle 1. In addition, a motor 113 drives a worm gear 114, which rotates a shaft 115 via a gear 116. The shaft 115 is connected to one or both of the camera 102 and the sensor 103 to rotate it (them) about a horizontal axis (FIG. 19).

Referring to FIGS. 13–15, the telescoping capability will now be described. A motor 121 is connected to turn a threaded shaft 122, which, as it turns, urges an outer telescoping shell 123 upward via a threaded bore 124. A plurality of cables 125 are connected between respective clamps 131 mounted on a telescoping inner shell 132 and clamps 133 mounted on an inside surface 134 of the tube 95. A series of rotatable guide pulleys 135 are set into the outer shell 123 to guide the cables 125 and the pulleys 135 extend to the inner surface 134 of the tube 95 to keep the outer shell 123 centered within the tube 95 as it is raised. As shown in FIG. 14, as the outer shell 123 is raised out of the tube 95, the inner shell 132 telescopes out of the outer shell 123 due to the action of the cables 125. Thus, the support 104 can be very rapidly raised and lowered thereby. An accordion-like seal 141, shown partially broken away in FIG. 15, extends along the tube 95 and to the support 104 to provide a watertight seal therebetween at all times. The seal 141 is connected at the top in a dynamic manner to allow rotation of the tube 95 relative to the seal 141. Note that the seal 141 has not been shown in FIG. 14 for ease of illustration. A coiled cable 142 extends between a sealed connector 143 on the tube 95 and a connector 144 on the support 104. The cable 142 can include electrical supply and control wiring for the motors 105 and 113, and power and control wiring plus coaxial video, audio and signal leads for the camera 102 and the sensor 103. A protective cage 145 surrounds the coiled cable 142 and the support 104 and camera 102 and sensor 103 can actually be lowered to a position within the protective cage 145. Within the housing 32, a receptacle 151 includes a well 152 which is sized and oriented to receive the motor 121.

Figure 21:
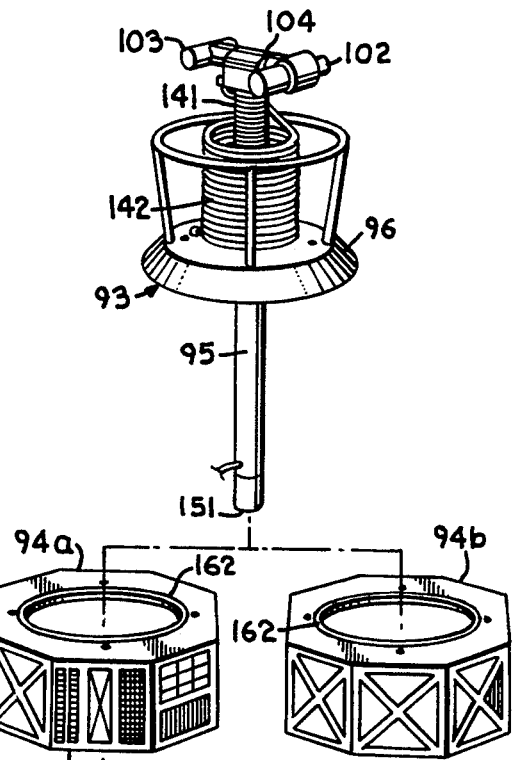
FIG. 21 is an enlarged and exploded, perspective view of the vehicle, showing the modular telescoping camera assembly and a pair of modular sensor panels which can alternatively be attached to the vehicle housing.
Figure 22:
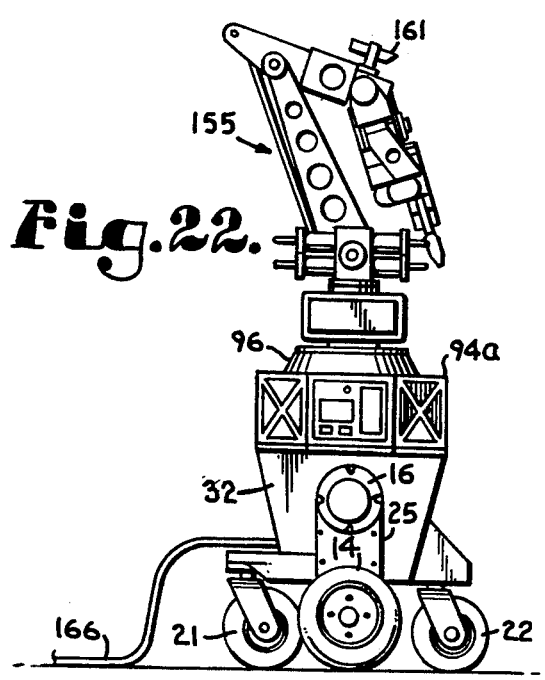
FIG. 22 is an enlarged, side plan view of the vehicle, with an optional robotic arm attached.

FIGS. 21 and 22 illustrate the modular nature of the vehicle 1. Referring to FIG. 21, a pair of sensor units 94a and 94b are illustrated, each with a different arrangement of sensors 153 mounted thereon. The sensors 153 can comprise, for example, spark detectors, microphones, speakers, input keypads and displays, radio antennas, transmitters and receivers, voltage, current or power sensors, carbon monoxide or other poisonous gas sensors, gas chromatography or other chemical sensors, Geiger counters, etc. The modular construction allows the vehicle 1 to be tailored for a specific use. With additional sensor panels 94, the vehicle 1 can be quickly retrofitted for an entirely different capability. Furthermore, the telescoping assembly 93 is also modular, and can be replaced by an entirely different module, such as a robotic arm 155, which can be equipped with a video camera 161. The robotic arm 155 can take the form of the robotic arm shown on the underwater manipulator illustrated and described in the applicant's U.S. Pat. No. 4,648,782 (hereinafter the '782 patent), which patent is incorporated herein by reference. Note that a pair of large O-ring type seals 162 are provided in channels 163 in the housing 32 and the sensor panels 94a and 94b to make the assembled vehicle water-tight. In fact, the vehicle 1 can reliably operate with everything but the support 104 and the camera 102 and sensor 103 immersed in water. Such conditions are often found in underground transformer vaults, etc.

Just as in the '782 patent, the arm 155 can be remotely controlled via an electrical control line, such as control line 166 in FIG. 22. Alternatively, FIG. 23 illustrates a block diagram of a radio remote control apparatus suitable for controlling the vehicle 1, including the telescoping inspection assembly 93 and the robotic arm 155. An operator interface 173, which can include a display panel and associated control keyboards, and a joystick 174 are connected to a microprocessor 175. The microprocessor 175 is programmed to provide control inputs from the interface 173 and the joystick 174 to a radio transceiver 181. The transceiver 181 modulates the control signals onto a radio signal, which is transmitted via an antenna 182 to an antenna 183 located on the vehicle 1 and an associated transceiver 184. A microprocessor 185 receives the control signals from the transceiver 184 and sends them to the appropriate control circuit.

The control circuits include reversible switches 191 and 192 for the drive motors 15 and 16, respectively, as well as reversible switches 193-195 for the telescoping motor 121, the horizontal rotation motor 105 and the vertical rotation motor 113. It is foreseen that a tilt switch (not shown) may be included in the vehicle 1 to turn off the drive motors, if the vehicle 1 becomes hung up on an overhead wire or the like and is about to turn over. An override would also be provided for the tilt switch to allow an operator to back the vehicle 1 away from a problem. In addition, for the robotic arm 155, a bank of servo operated valves 201 serves to control the various arm functions, including extension, rotation, gripping, etc. (see FIG. 32 of the '782 patent).

The microprocessor 185 also sends control signals to the camera 102, the temperature sensor 103, and the sensor panel 94 and receives video signals from the camera 102 and sensor outputs from the temperature sensor 103 and the sensor panel 94. The video signals and sensor outputs are forwarded to the operator interface via the transceivers 184 and 181. Signalling can be via frequency shift keying, pulse width modulation, or any other suitable digital signalling methodology.

OPERATION

The vehicle 1 is lowered into a vault via the frame 2 and cable 3. Once placed in the area to be inspected, the vehicle 1 is driven from the frame 2 and can be remotely controlled via the operator interface 173 to move to suitable locations for video inspections and/or sensor tests. Steering is accomplished by differentially driving the drive motors 15 and 16 to turn the vehicle 1 while watching a video signal from the camera 102. Once the vehicle 1 is in a desired position, the switches 193–195 are used to properly position the camera 102 and the sensor 103. Preferably the camera 102 can be extended to a height of at least about 8 feet from the floor to allow the inspection of relatively tall transformers. A video picture of the inspection area is then retrieved from the camera 102.

Various sensors, such as the infrared temperature probe 103, an oxygen analyzer and other sensor units in the sensor panels 94, are used for determining the environmental conditions within the inspection area, with the sensor outputs forwarded to the operator interface 173. Should it be determined that the inspection area is safe for humans, a repairman can then enter the area to perform any repairs or maintenance needed. In the alternative, should the inspection area include unacceptable hazards, such as high temperatures, poisonous gasses or abnormal voltage readouts, for example, the vehicle 1 will be removed. The vehicle 1 can then be retrofitted with a robotic arm with its own camera, such as the arm 155, and an alternative sensor panel 94b, if needed, to perform additional testing and/or basic maintenance and repair work.

While the remotely controllable vehicle unit 1 has been shown and described for use in utility applications, it should be recognized that its use is not so limited. Inspections and/or repairs can be performed in virtually any remote location which is inaccessible and/or hazardous to humans. Furthermore, the vehicle has been illustrated and described as including four wheels, but the number of wheels could be increased if additional stability were needed, and still retain the articulating support assembly design. Remote control has been illustrated via a radio link, but other suitable signalling methods, including hard wiring, fiber optic, ultrasonic, etc. can also be employed.

It is to be understood that while certain forms of the present invention have been illustrated and described herein, it is not to be limited to the specific forms or arrangement of parts described and shown.

What is claimed and desired to be secured by Letters Patent is as follows:

1. A robotic inspection vehicle comprising:
   (a) a vehicle housing;
   (b) an articulating support and drive assembly including four wheels, said assembly being adapted to support said vehicle by maintaining at least three of said wheels in a supporting position when said vehicle is traversing an obstacle;
   (c) environmental monitoring means for sensing ambient conditions around said vehicle, said monitoring means being mounted on said vehicle housing; and
   (d) means for shifting the center of gravity of said vehicle over the three wheels which are in a supporting position when said vehicle is traversing said obstacle.

2. A vehicle as in claim 1, wherein said assembly comprises:
   (a) first and second drive wheels, each of which are independently powered; and
   (b) first and second support wheels.

3. A vehicle as in claim 2 wherein:
   (a) said drive wheels are spaced to allow passage through a 24 inch manhole and the remainder of the vehicle 1 has a diameter substantially no greater than the spacing between said drive wheels such that said vehicle may pass through such a manhole.

4. A vehicle as in claim 3, wherein:
   (a) said support wheels are free castering, with said first support wheel positioned in front of the drive wheels and said second support wheel positioned behind said drive wheels, whereby said vehicle can be rotated about a central axis thereof in an area approximately the same diameter as its own width.

5. A vehicle as in claim 4, wherein:
   (a) said vehicle further comprises a platform; and
   (b) said first support wheel and at least one of said drive wheels are attached to said platform which is pivotable with respect to said vehicle housing.

6. A vehicle as in claim 5, wherein:
   (a) said first support wheel and both of said drive wheels are attached to said platform; and
   (b) said second support wheel is connected to said housing; whereby
   (c) when said first support wheel encounters an object, said platform pivots upward relative to said housing such that said first support wheel is raised.

7. A vehicle as in claim 6, wherein:
   (a) said vehicle further comprises first and second drive motors and first and second drive mechanisms;
   (b) each of said drive wheels is connected to a respective one of said first and second drive motors via a respective one of said first and second drive mechanisms; and
   (c) said first and second drive motors and said first and second drive mechanisms are connected to said platform; whereby
   (d) when said platform is pivoted upward, said drive motors and said drive mechanisms are pivoted toward said second support wheel, causing the center of gravity of said vehicle to shift to a point between said drive wheels and said second support wheel.

8. A vehicle as in claim 7, wherein:

(a) said vehicle housing is also pivotable with respect to said platform; whereby (b) when said second support wheel encounters an obstacle, said housing pivots forward toward said first support wheel, causing the center of gravity of said vehicle to shift to a point between said main wheels and said first support wheel.

9. A vehicle as in claim 1, wherein:
(a) said vehicle housing comprises a fixed housing and at least one modular assembly removably attached to said fixed housing.

10. A vehicle as in claim 9, wherein:
(a) said vehicle housing further comprises a modular sensor panel surrounding a portion of said modular assembly.

11. A vehicle as in claim 10, wherein:
(a) said modular sensor panel comprises a plurality of interchangeable sensor units.

12. A vehicle as in claim 9, and wherein:
(a) said modular assembly includes a telescoping inspection assembly.

13. A vehicle as in claim 12, wherein:
(a) said telescoping inspection assembly includes a motor driven telescoping shaft adapted to raise and lower a support positioned near the top thereof.

14. A vehicle as in claim 13, wherein:
(a) said telescoping inspection assembly includes a video camera mounted on said support.

15. A vehicle as in claim 14, wherein:
(a) said support includes means for selectively rotating said support both vertically and horizontally with respect to a remainder of the vehicle.

16. A vehicle as in claim 12, wherein:
(a) said modular assembly comprises a remotely controllable robotic arm.

17. A vehicle as in claim 16, wherein:
(a) said remotely controllable robotic arm comprises an inspection camera mounted thereon.

18. A robotic vehicle comprising:
(a) a vehicle housing;
(b) an articulating support and drive assembly including four wheels, said assembly including:
(i) first and second drive wheels, each of which are independently powered;
(ii) first and second support wheels with said first support wheel positioned in front of said drive wheels and said second support wheel positioned behind said drive wheels;
(iii) a platform which is adapted to be pivotable with respect to said vehicle housing, said first support wheel and both of said drive wheels being rigidly attached to said pivotable platform;
(d) said second support wheel being rigidly connected to said vehicle housing; whereby
(e) when said first support wheel encounters an object, said platform pivots upward relative to said housing such that said first support wheel is raised.

19. A vehicle as in claim 18, wherein:
(a) said vehicle further comprises first and second drive motors and first and second drive mechanisms;
(b) each of said drive wheels are connected to a respective one of said first and second drive motors via respective first and second drive mechanisms; and
(c) said first and second drive motors and said first and second drive mechanisms are connected to said platform; whereby (d) when said platform is pivoted upward, said drive motors and said drive mechanisms are pivoted toward said second support wheel, causing the center of gravity of said vehicle to shift to a point between said drive wheels and said second support wheel.

20. A vehicle as in claim 19, wherein:
(a) said vehicle housing is also pivotable with respect to said platform; whereby
(b) when said second support wheel encounters said obstacle, said housing pivots forward toward said first support wheel, causing the center of gravity of said vehicle to shift to a point between said drive wheels and said first support wheel.

21. A vehicle as in claim 18, wherein:
(a) said support wheels are free castering, whereby said vehicle can be rotated in an area having approximately the same diameter as the width of the vehicle.

22. A vehicle as in claim 18, wherein:
(a) said housing includes a compartment which is positioned below the center of gravity of said vehicle; and
(b) one or more batteries are located in said compartment.

23. A robotic vehicle comprising:
(a) a vehicle housing;
(b) an articulating support and drive assembly including four wheels, said assembly being adapted to support said vehicle by maintaining at least three of said wheels in a supporting position when said vehicle is traversing an obstacle; and
(c) means for shifting the center of gravity of said vehicle over the three wheels which are in a supporting position when said vehicle is traversing said obstacle.

24. A robotic inspection vehicle comprising:
(a) a vehicle housing;
(b) a vehicle platform which is pivotable with respect to said housing;
(c) an articulating support and drive assembly including four wheels, said assembly being adapted to support said vehicle by maintaining at least three of said wheels in a supporting position when said vehicle is traversing an obstacle, two of said wheels comprising respective first and second drive wheels, each of which are independently powered, and the remaining two of said wheels comprising respective first and second free castering support wheels;
(d) said first support wheel and both of said drive wheels being attached to said platform and said second support wheel being connected to said housing; whereby
(e) when said first support wheel encounters an object, said platform pivots upward relative to said housing such that said first support wheel is raised.

25. A vehicle as in claim 24, wherein:
(a) said vehicle further comprises first and second drive motors and first and second drive mechanisms;
(b) each of said drive wheels is connected to a respective one of said first and second drive motors via a respective one of said first and second drive mechanisms; and
(c) said first and second drive motors and said first and second drive mechanisms are connected to said platform; whereby (d) when said platform is pivoted upward, said drive motors and said drive mechanisms are pivoted toward said second support wheel, causing the center of gravity of said vehicle to shift to a point between said drive wheels and said second support wheel.

26. A vehicle as in claim 25, wherein:
(a) said vehicle housing is also pivotable with respect to said platform; whereby
(b) when said second support wheel encounters an obstacle, said housing pivots forward toward said first support wheel, causing the center of gravity of said vehicle to shift to a point between said main wheels and said first support wheel.

27. A robotic vehicle comprising:
(a) a vehicle housing;
(b) first and second drive motors and first and second drive mechanisms;
(c) an articulating support and drive assembly including four wheels, said assembly including:
    (i) first and second drive wheels, each of which are independently powered via a respective one of said drive motors and drive mechanisms;
    (ii) first and second support wheels with said first support wheel positioned in front of said drive wheels and said second support wheel positioned behind said drive wheels;
    (iii) a platform which is pivotable with respect to said vehicle housing, said first support wheel and both of said drive wheels being attached to said pivotable platform;
(d) said second support wheel being connected to said vehicle housing, said vehicle housing also being pivotable with respect to said platform and
(e) said first and second drive motors and said first and second drive mechanisms being connected to said platform; whereby
(f) when said first support wheel encounters an object, said platform pivots upward relative to said housing such that said first support wheel is raised and when said platform is pivoted upward, said drive motors and said drive mechanisms are pivoted toward said second support wheel, causing the center of gravity of said vehicle to shift to a point between said drive wheels and said second support wheel and when said second support wheel encounters said obstacle, said housing pivots forward toward said first support wheel, causing the center of gravity of said vehicle to shift to a point between said main wheels and said first support wheel.

28. A vehicle as in claim 27, wherein:
(a) said housing includes a compartment which is positioned below the center of gravity of said vehicle; and
(b) one or more batteries are located in said compartment.

* * * * *